Feb. 23, 1937. W. C. GRAHAM 2,071,624
HEAT TRANSFER APPARATUS
Filed Jan. 26, 1934 2 Sheets-Sheet 1
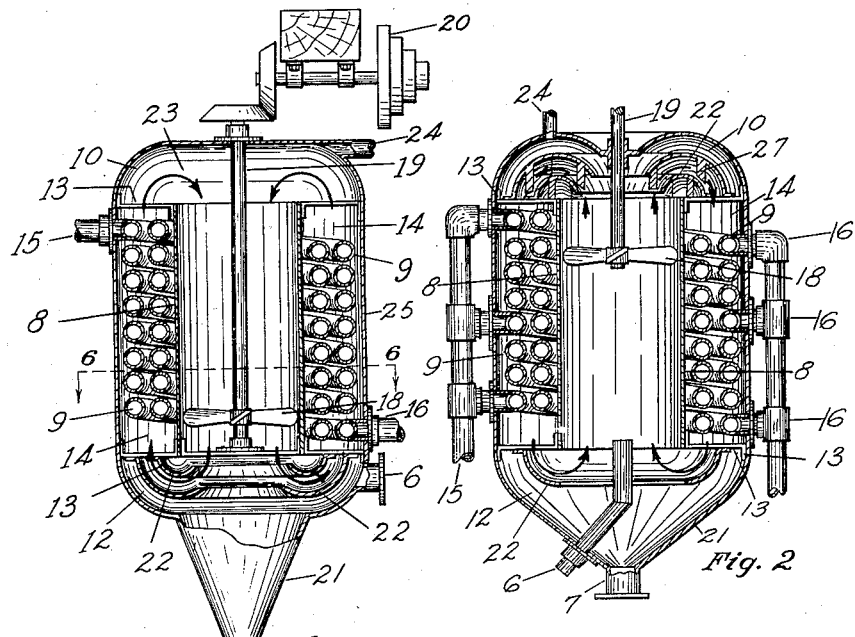
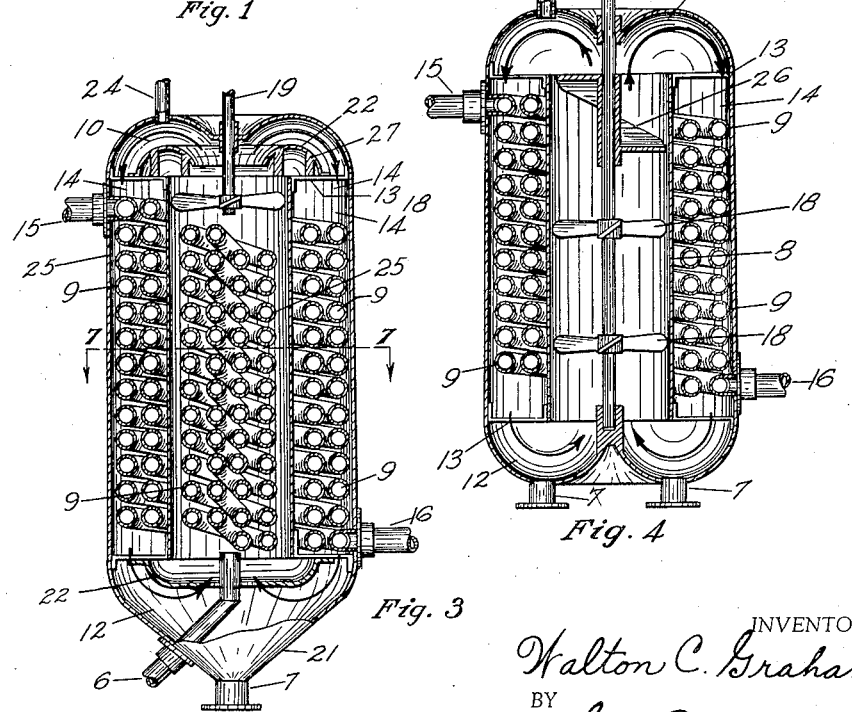
INVENTOR.
Walton C. Graham
BY
G. J. Rollandet
ATTORNEY.

Feb. 23, 1937. W. C. GRAHAM 2,071,624
HEAT TRANSFER APPARATUS
Filed Jan. 26, 1934 2 Sheets-Sheet 2

INVENTOR.
Walton C. Graham
BY
G. J. Rollandet
ATTORNEY.

Patented Feb. 23, 1937

2,071,624

UNITED STATES PATENT OFFICE 2,071,624

HEAT TRANSFER APPARATUS

Walton C. Graham, Denver, Colo.

Application January 26, 1934, Serial No. 708,394

16 Claims. (Cl. 257—106)

This invention relates to apparatus for the transference of heat in a process of recovering solids in solution by crystallization.

A process of this character may be performed by either increasing or decreasing the temperature of the solution under treatment, in accordance with the nature of the material in solution. If the matter in solution is soluble at a high temperature and less soluble at a lower temperature, crystallization is preferably effected by a reduction in temperature, while if the material to be recovered is only slightly less soluble at a low temperature than at a high temperature, it is more practical to effect crystallization of the material by evaporation.

Both methods of recovering the solids from the solution may be effectively obtained by the use of the apparatus, hereinafter to be described, it being understood that variations in the construction and arrangement of the parts comprised therein, in order to adapt it more especially for one method or another, fall well within the scope of the invention.

Apparatus for recovering solids from solutions by crystallization, used heretofore, are generally objectionable by reason of a gradual loss of efficiency and waste of time due to accumulation of solid matter upon the heat-transferring surfaces and consequent diminution of their conductive capacity, and it is an object of the present invention to provide an apparatus in which the deposit of crystallized matter upon heat-transferring surfaces is effectively avoided.

Another object of the invention resides in an arrangement of cooperative devices by which the deposit of recovered solids upon heat-transferring parts is reduced to a point of complete elimination by a continuous circulatory and whirling movement of solution under treatment.

A further object of the invention is to provide an apparatus of the character stated hereinbefore in which the transfer of heat is uniform or homogeneous throughout the entire body of solution under treatment, and still other objects are to be found in details of construction and in novel arrangements and combinations of elements comprised in the apparatus, as will be fully brought out in the course of the following description.

Figure 5:
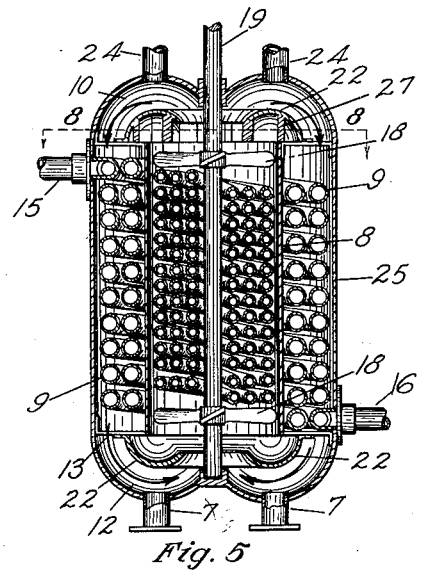
Figure 6:
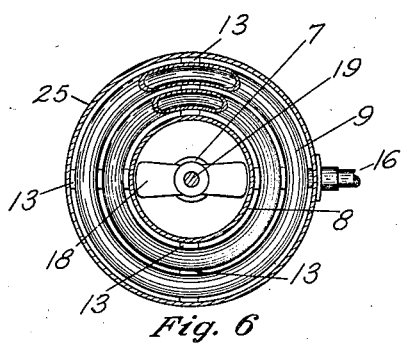
Figure 7:
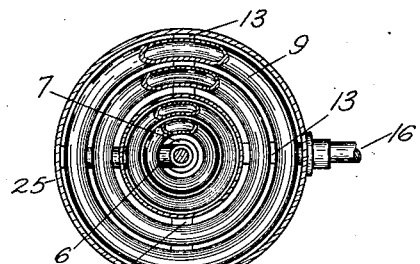
Figure 8:
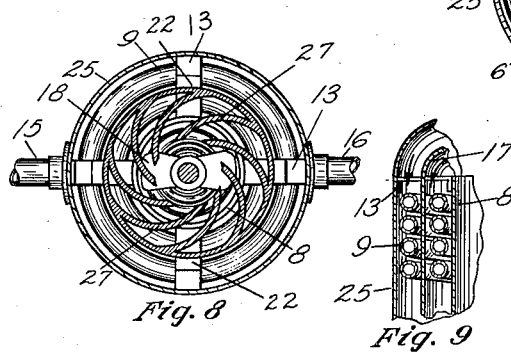

In the accompanying drawings, in the several views of which like parts are similarly designated, Figure 1 is a vertical, sectional elevation of an apparatus embodying the distinctive features of the invention, which is particularly adapted for use in recovering solids from a solution by evaporation, but which also may be employed effectively for the separation of the crystals from the solution by cooling, Figure 2 is a similar section of the apparatus showing certain modifications, more especially adapting the device for use in crystallizing the solids in solution by the cooling method, Figure 3 is a section similar to that of Figures 1 and 2, showing still other modifications in the construction of the apparatus, more particularly designed to increase the transfer surface in either the evaporation method or the cooling method, Figure 4 is another similar sectional elevation showing the apparatus in a form particularly adapted for use in the sugar industry, Figure 5 is still another similar section showing another modification in the arrangement of the elements comprised in the invention, Figure 6 is a transverse section along the line 6—6 of Figure 1, Figure 7 is a similar section taken on the line 7—7 of Figure 3, Figure 8 is a section in the plane indicated by the line 8—8 of Figure 5.

Figure 9:
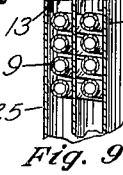
Figure 10:
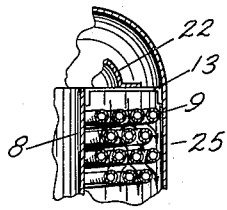
Figure 11:
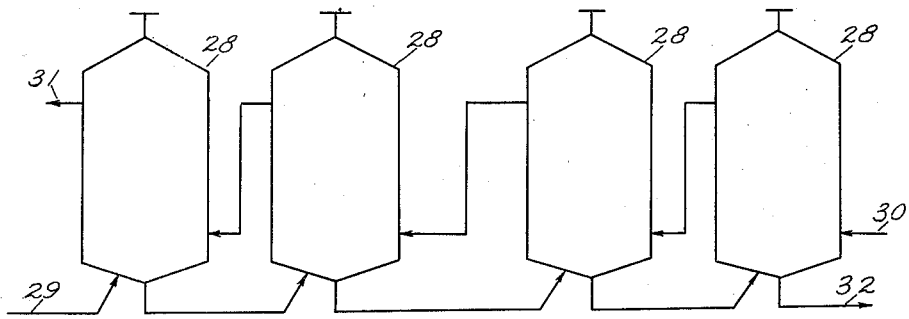

Figure 9 is a section of a portion of the apparatus, showing a modification in the arrangement of the heating or cooling element forming an essential part thereof, Figure 10 is another fragmentary sectional view, showing still another arrangement of the heating or cooling element, and Figure 11 is a view in outline of a system in which a plurality of units, made according to the present invention, are combined in a system of continuous operation.

The most essential elements comprised in the invention are an upright shell-like vessel of preferably cylindrical form, closed at its ends by heads of various shapes, as shown in the drawings, and provided with openings for the inlet of a solution to be treated and for the outlet of liquid and crystals, an open-ended cylindrical shell within the other in co-axial relation thereto, tubular coils extending transversely of the cylinders for the circulation of a heating medium or a cooling agent, and disposed either within the space between the cylinder and/or within the inner cylinder, and one or more impellers disposed to impart a circulatory movement to the solution for its contact with the coils in a continuous movement.

Added to the above named elements may be one or more diffusion vanes which, by a deflecting and diffusing influence upon the solution, aid in directing it to move in a circulatory movement along a determinate course, and cause it to spread or disseminate for its homogeneous subjection to the cooling or heating influence of the medium circulating through the coils.

The construction and arrangement of the elements are subject to many variations, according to the nature of the material under treatment, a number of which have been shown in the drawings.

Referring first to Figure 1, an upright hollow cylindrical vessel 5 is closed at its ends by heads 10 and 12.

An open-ended hollow cylinder 8 of lesser diameter held inside the outer cylinder by braces 13 or other suitable means provides an annular space 14 between the cylinders which, together with the interior of the inner cylinder and the spaces within the heads of the outer cylinder, forms a path for the continuous circulatory movement of the solution in a given direction.

Within the annular space 14 are the transversely disposed coils 9 connecting with a source of heating agent or cooling agent by suitable connections such as are shown at 15 and 16.

The coils may be placed in any suitable arrangement. They may consist of one helix or spiral or of a plurality of helices or spirals, in parallel relation to each other. They may be placed in staggered formation as shown in Figure 10, or they may be divided by partitions 17 as indicated in Figure 9, and they may be connected in parallel or in series, all within the scope of the invention.

Inside the inner cylindrical vessel is an impeller 18 of conventional form, on a shaft 19 which extends through a fluid-tight bearing in the upper head of the outer shell. The shaft is connected for rotation with a conveniently located motor or other source of energy, and it is preferred to establish this connection through the medium of a variable speed transmission, such as the stepped pulley 20.

The lower head of the outer cylinder is downwardly extended to provide a sump 21 which receives the crystals separated from the solution and which has an outlet 7 for the discharge of the crystals, together with exhausted liquid. In the space of the head above the sump and below the open lower end of the inner shell are annular diffusion vanes 22, the functions of which have been explained hereinbefore. As shown, the diffusion vanes are of annular form, and they are dished or concaved to direct the solution in an even and equable movement without abrupt changes of directions. Two such annular diffusion vanes have been shown in the drawings, and they are held in place by any suitable means as, for example, by being attached to the braces 13 of the inner cylinder.

In the operation of the apparatus, the solution to be treated is fed into the vessel as at 6, and a cooling fluid or a heating agent of any desirable and suitable nature is circulated through the tubes 9 which conjointly provide the heat-transfer surface of the device.

The impeller 18 imparts a circulatory movement to the solution along a continuous path established by the spaces within and without the inner cylinder, the hollow heads 10 and 12 and the diffusion vanes 22. The tubes extend transversely of this path with the result that the circulating solution is continuously subjected to the cooling or heating influence of the fluid circulated through the coils.

Crystals below a certain size will be maintained in suspension and circulate at a certain liquid velocity, whereas, with the increase in size by their continued growth, they reach a point at which they automatically drop out of the solution by reason of the fact that the given velocity is not sufficient to maintain them in suspension and that up to a certain size for any given velocity the crystals will remain in suspension.

The shape of the heads and the diffusion vanes and the whirling movement imparted to the solution by the rotary movement of the impeller cause the solution to be constantly diffused over the entire cross-sectional area of the continuous path through which it circulates, with the obvious result that the cooling or heating influence permeates the solution evenly and homogeneously and that the deposition or coating of crystals on the heat-transfer surfaces is completely eliminated.

The crystals both in cooling and in evaporating originate as nuclei, directly in contact with the heat-transfer surfaces, and unless prevented by the application of some exterior force, the fine crystals will remain attached to the surface and continue to increase in size and number until a thick continuous crystal coating is formed, which retards and ultimately may prevent the transfer of heat.

In the present invention, it is the movement of the liquid at a certain velocity and in a certain manner which by a whirling, scouring action removes the fine crystals from the heating surfaces, as they are formed, and maintains them in suspension in the liquid, where they increase in size instead of remaining attached to the heat-transfer surfaces.

The prevention of the deposit of crystals on the heat-transfer surfaces is the primary object of the present invention, since, as stated hereinbefore, the deposit of minute crystals, which accumulatively produce an insulative coating, has been a serious obstacle to the recovery of solids by crystallization from solution by heat transference as heretofore conducted. The coatings of solids upon the heat-transfer surfaces not only reduce the rate of transfer in proportion to their thickness, but they necessitate in many instances a complete suspension of operations for removal of the crystalline deposits. At times these cleanings had to be resorted to so frequently that the loss of time necessitated the employment of apparatus of greater capacity or of a number of separate units, operating either simultaneously or during alternate periods. All of these objectionable features of former devices are successfully obviated in the use of the present apparatus as herein described.

The form and design of the heads and the diffusion vanes prevent abrupt changes of directions, and thereby advance the smooth, rapid, and continuous circulating movement of the solution throughout its path, and direct it to flow uniformly and homogeneously over and by the heat-transfer surfaces.

A large and extended heating surface is combined with a movement of the solution which brings every part thereof continuously in intimate contact with the entire surface. The heat-transfer is consequently very rapid and permeates the entire body of the solution homogeneously. Since the velocity and motion of the liquid over the heat-transfer surfaces prevents deposition of crystal coatings upon said surfaces, maximum heat transfer is constantly maintained.

The device illustrated in Figure 1 is particularly adapted for the recovery of materials by evaporation since the upper head of the outer cylinder presents ample space 23 for rising vapors which may escape through an outlet 24. The vapor space may be made of any desirable volume, it being, in practice, advantageous to make its height approximately equal to that of the heat-transfer portion.

However, the apparatus is equally well suited for the recovery of the material in a cooling process, and it is to be understood that while the different modifications illustrated in the drawings adapt the apparatus more particularly for one or the other of the processes herein described, it may be used for either process if so desired.

To avoid repetitions of statements in describing the other forms of the invention, as shown, it should be generally assumed that the location of the inlet for solution, the outlet for liquid and crystals, the vapor outlet, and the inlet and outlet for the cooling or heating fluid may be varied according to varying conditions. They have been designated by the same reference numerals throughout the views. The number, shape, and location of the diffusion vanes may likewise be varied, and the form, number, and relative arrangement and connections of the heating tubes may be varied as stated hereinbefore. One or more impellers may be employed according to the speed desired, and these impellers may be of any suitable form, size, and construction. By virtue of these statements a brief description of the other views of the drawings will suffice.

Referring to Figure 2, but one diffusion vane is located below the inner cylinder, and a plurality of vanes are provided above the same, the heat-transfer coils are connected in parallel, and the inlet is extended into the lower part of the inner cylinder. This form of the apparatus is more particularly adapted for crystallization by the method of cooling the solution.

In Figure 3, the cylinders are shown as of greater depth than those of Figures 1 and 2, single diffusion vanes are placed above and below the inner cylinder, and coils 25 additional to those in the space 14 between the cylinders are placed within the open-ended inner cylinder. These supplemental coils increase the heat-transfer surface, and they are likewise disposed transversely of the path of the circulating solution, including the spaces inside and outside the inner cylinder.

The inner coils may be connected directly with the source of heating or cooling fluid, or they may be connected with the outer coils in series.

In the construction shown in Figure 4, a number of impellers are mounted on one and the same shaft inside the inner cylinder, the upper impeller 26 may be in the form of a section of the screw, while the others are of conventional propeller form. The inlet and the outlet are both at the bottom of the lower head of the outer shell, which is concave similar to the upper head. This form of the apparatus has no diffusion vanes, and is particularly adapted for the treatment of heavy materials, such as massecuite or other viscous liquids produced in processes of extracting sugar from saccharine roots or plants. In the operation of this apparatus, the velocity is necessarily low, but the circulating movement of the material remains continuous.

Figure 5 shows the use of the impellers and heating coils within the inner cylinder. This type of apparatus is also particularly adapted for the recovering of the solids from the solution by the cooling method, and it includes a further novel feature in that one or more of the diffusion vanes 22 are provided with series of curved blades inside their annular concavities, as best shown in Figure 8, for the purpose of cooperating with the impeller or impellers in imparting a swirling motion to the solution, which, as stated hereinbefore, aids in distributing the cooling or heating influence uniformly throughout the body of the circulating solution and in preventing the deposit of solids upon the heat-transfer surfaces.

In Figure 11, a plurality of units 28, each constructed in accordance with the invention, as exemplified in Figures 1 to 5 hereinbefore described, are connected in series. The solution is fed into a unit at one end of the series as at 29, a cooling agent may be fed into the coils of the unit at the opposite end of the series, as at 30, and after passing successively through the coils of all the units, be discharged, as at 31, while exhausted or partially exhausted liquid, with the crystals in suspension, is circulated from one unit to another to be finally discharged at the point of delivery 32. By the use of this system any quantity of solution may be economically treated in a continuous operation, subject to a continuous feed.

It will be understood that by other variations in the form and arrangement of the elements of the apparatus, herein described, the apparatus may be adapted for the treatment of solutions of every degree of viscosity.

In the recovery of crystals from the solution by the cooling method, the direction of flow is preferably upwards through the inner cylinder and downwardly through the annular space between the cylinders, during which flow the solution is brought repeatedly in contact with the heat transfer surface placed transversely to the direction of the flow.

The velocity of the flow may be varied from a high rate in the treatment of solutions of little or no viscosity which deposit crystals easily, as salt or potash solutions, and therefore require a high velocity to prevent the deposit of crystals upon the heat-transfer surfaces, to a low rate for the treatment of viscous solutions, as sugar solutions and the like.

The movement of the impellers and, if desired, the provision of curved blades in one or more of the diffusion vanes impart a spiral motion to the solution and promote a condition of homogeneity throughout the mass.

The diffusion vanes and the curved inner surfaces of the heads of the outer cylinder provide for a uniform circulating movement of the mass with little loss in velocity, and they divide and diffuse the solution so as to derive the greatest benefit of its passage over and around the transversely disposed heat-transfer surfaces.

The rate of movement of the crystallizing solution may be changed at will in accordance with varying conditions, by means of the step-pulley or other suitable expedient, and the rate of cooling or heating may also be varied independently of the rate of movement of the crystallizing solution, all of which is of particular value in treating viscous solutions, such as sugar solutions in which viscosity increases with cooling.

The control of the rates of cooling or heating and of circulation also permits of controlling the size of crystals produced in the operation, and their discharge from the apparatus.

In some forms of the apparatus as, for example, that shown in Figure 1, a vortex or whirlpool is created at a point directly above the center of the bottom, in which the velocity of the moving mass varies from the maximum to a minimum, permitting a sorting action of the crystals as to size, the larger crystals settling to the bottom, while crystals that are undersize remain in circulation until they have acquired the required size.

It will be apparent from the above that by the use of my invention an apparatus is provided which is adapted for the recovery of solids from solutions, by either cooling or evaporation, under every possible condition, and irrespective of the viscosity of the solution, or the nature of the material in solution, and that owing to the elimination of deposits upon the heat-transfer surfaces, and the continuous circulating and whirling movement of the solution under treatment, the apparatus combines great efficiency and capacity with practicability in use.

What I claim and desire to secure by Letters Patent is:

1. Apparatus for the recovery of solids from solutions by crystallization, comprising a vessel having interiorly a path for liquid in a circulatory movement, an impeller to effect said movement, heat-transfer coils in said path, transverse to the direction of said movement, and diffusion vanes at opposite points in said path, controlling the movement of the liquid in the path.

2. Apparatus for the recovery of solids from solutions by crystallization, comprising a vessel having interiorly a path for liquid in a circulatory movement, an impeller to effect said movement, heat-transfer coils in said path, transverse to the direction of said movement, a diffusion-vane, controlling the movement of the liquid in the path, and curved blades on the diffusion-vane, to impart a whirling motion to the liquid, supplemental to the impeller.

3. Apparatus for the recovery of solids from solutions by crystallization, comprising an upright vessel closed at its ends and having a feed intake and an outlet for liquid and solids, an open-ended shell in the vessel, spaced from the wall and from the ends thereof, to form a continuous path for the circulatory movement of the solution, heat-transfer coils in the path transverse to the direction of said movement, an impeller to effect the circulating movement of the solution in said path, and diffusion vanes in the vessel beyond opposite ends of the shell.

4. Apparatus for the recovery of solids from solutions by crystallization, comprising an upright vessel closed at its ends and having a feed intake and an outlet for liquid and solids, an open-ended shell in the vessel, spaced from the wall and from the ends thereof, to form a continuous path for the circulatory movement of the solution, heat-transfer coils in the path transverse to the direction of said movement, an impeller to effect the circulating movement of the solution in said path, an annular, concave diffusion vane in the vessel, beyond an end of the shell, and curved blades in the vane, to impart a swirling motion to the solution.

5. Apparatus for the recovery of solids from solutions by crystallization, comprising an upright vessel closed at its ends and having a feed intake and an outlet for liquid and solids, an open-ended shell in the vessel, spaced from the wall and from the ends thereof, to form a continuous path for the circulatory movement of the solution, heat-transfer coils in the path transverse to the direction of said movement, and an impeller to effect the circulating movement of the solution in said path, the ends of the vessel being curved to direct the solution for its even movement in the path.

6. Apparatus for the recovery of solids from solutions by crystallization, comprising an upright vessel closed at its ends and having a feed intake and an outlet for liquid and solids, an open-ended shell in the vessel, spaced from the wall and from the ends thereof, to form a continuous path for the circulatory movement of the solution, heat-transfer coils in the path transverse to the direction of said movement, an impeller to effect the circulating movement of the solution in said path, and an annular, concave diffusion vane in the vessel, beyond an end of the shell, an end of the vessel being curved to cooperate with the vane in directing the solution for its even movement in the path.

7. Apparatus for the recovery of solids in crystalline form from solutions by heat exchange, comprising a vessel having interiorly a path for liquid in a circulatory upwardly and downwardly directed movement, an impeller to effect said movement, and heat-transfer coils substantially co-extensive with said path, disposed transverse to the direction of said movement, whereby the liquid is subjected to substantially uniform heat transfer throughout its circulatory movement.

8. Apparatus for the recovery of solids in crystalline form from solutions by heat exchange, comprising a vessel having interiorly a path for liquid in a circulatory upwardly and downwardly directed movement, an impeller to effect said movement, heat transfer coils in said path, and an annular diffusion vane disposed at a point of change in direction of the said path.

9. Apparatus for the recovery of solids in crystalline form from solutions by heat exchange, comprising a vessel, an open-ended shell within and spaced from the vessel and defining a path for liquid in a circulatory, upwardly and downwardly directed movement, an annular diffusion vane at an end of the shell, controlling said movement, an impeller to effect said movement, and heat transfer coils in said path.

10. Apparatus for the recovery of solids in crystalline form from solutions by heat exchange, comprising a vessel having interiorly a path for liquid in a circulatory upwardly and downwardly directed movement, an impeller to effect said movement, heat-transfer coils in said path, and a feed inlet in the lower portion of the vessel disposed in said path.

11. Apparatus for the recovery of solids in crystalline form from solutions by heat exchange, comprising a vessel, an open-ended shell within and spaced from the vessel and defining a path for fluids in a circulatory upwardly and downwardly directed movement, an impeller to effect said movement, and heat-transfer coils disposed transverse to the direction of movement of the fluids, across the spaces inside and outside the shell and substantially coextensive therewith, whereby the transfer of heat is substantially uniform thruout the entire body of fluent material.

12. Apparatus for the recovery of solids in crystalline form from solutions by heat exchange, comprising a vessel having interiorly a path for fluids in a circulatory upwardly and downwardly directed movement, an impeller to effect said movement, heat-transfer coils disposed transverse to the direction of said movement, and an annular, concave diffusion vane in the vessel disposed at a point of change in direction of said path.

13. Apparatus for the recovery of solids in crystalline form from solutions by heat exchange, comprising a vessel having interiorly a path for fluids in a circulatory upwardly and downwardly directed movement, an impeller to effect the upward and downward movement of the fluids and heat-transfer coils disposed transverse to the direction of said movement in a helical arrangement, the coils and impeller cooperating to produce a helical circulatory movement of fluids in the vessel.

14. Apparatus for the recovery of solids in crystalline form from solutions by heat exchange, comprising a vessel, an open-ended shell within and spaced from the vessel and defining a path for fluids in a circulatory upwardly and downwardly directed movement, heat-transfer coils disposed transverse to the direction of movement of the fluent material, and means for effecting said movement in a helical motion.

15. Apparatus for the recovery of solids in crystalline form from solutions by heat exchange, comprising a vessel having interiorly a path for fluids in a circulatory upwardly and downwardly directed movement, helical heat-transfer coils in said path, and means for inducing a circulatory movement of fluent material in the vessel in a helical motion about the coils.

16. Apparatus for the recovery of solids in crystalline form from solutions by heat exchange, comprising a vessel having interiorly a path for fluids in a circulatory upwardly and downwardly directed movement, helical heat-transfer coils in said path, an impeller for inducing a circulatory movement of fluent material in the vessel, and an element cooperating with the impeller for imparting a helical motion to the circulating material in its passage about the coils.

WALTON C. GRAHAM.